United States Patent [19]

Rayburn

[11] 4,418,492
[45] Dec. 6, 1983

[54] FISHING FLOAT

[76] Inventor: Sam E. Rayburn, P.O. Box 704, Loveland, Colo. 80537

[21] Appl. No.: 286,900

[22] Filed: Jul. 27, 1981

[51] Int. Cl.³ .............................................. A01K 93/00
[52] U.S. Cl. .................................................... 43/44.9
[58] Field of Search ................... 43/44.9, 42.36, 44.87, 43/44.91, 44.95, 44.93; 24/255 BS, 255 R, 129 R, 129 B, 129 D

[56] References Cited

U.S. PATENT DOCUMENTS

| | | | |
|---|---|---|---|
| 668,254 | 2/1901 | Dickinson | 43/44.9 |
| 1,468,720 | 9/1923 | Low | 43/44.91 |
| 1,549,881 | 8/1925 | Johnson | 43/44.92 |
| 2,001,241 | 5/1935 | De Vries | 43/44.9 |
| 2,223,823 | 12/1940 | Hampton | 43/44.9 |
| 2,315,048 | 3/1943 | Croft | 43/44.9 |
| 2,572,340 | 10/1951 | Hockenhull | 43/44.9 |
| 3,056,229 | 10/1962 | Haney | 43/44.91 |
| 3,273,278 | 9/1966 | Lynch | 43/44.9 |
| 3,733,734 | 5/1973 | Hysaw | 43/44.9 |

*Primary Examiner*—Nicholas P. Godici
*Assistant Examiner*—Kurt Rowan
*Attorney, Agent, or Firm*—Harvey B. Jacobson

[57] ABSTRACT

A removable fishing float is of a slip-type construction and includes a radially extending slit into which a fishing line may be positioned. Additionally, the float is provided with an axially extending bore in communication with the slit, and a slit tube is positioned through the bore. The respective slits contained in the float and slit tube are alignable by a manual rotation of the tube within the float bore, so as to permit a fishing line to be directed through the slits to be thus positioned within the slit tube, and once the fishing line is positioned within the tube, the tube may again be rotated to effectively prevent the line from coming out of engagement with the float. Additionally, a pair of star line locks are provided, such locks having five appendages with two of the appendages being in parallel alignment and being of a length greater than the remaining three appendages. The star line locks are positionable within the respective ends of the slit tube with the two longer appendages extending outwardly through the tube's slit. A positioning of the star line locks within the slit tube with the two longer appendages extending outwardly from the tube slit will cause the appendages to be moved into an abutting relationship so as to effectively prevent the fishing line from moving into the slit portion of the slit tube extending outwardly from the float bore, thus to prevent entanglements and snags between the line and the tube slit.

3 Claims, 6 Drawing Figures

U.S. Patent     Dec. 6, 1983     4,418,492
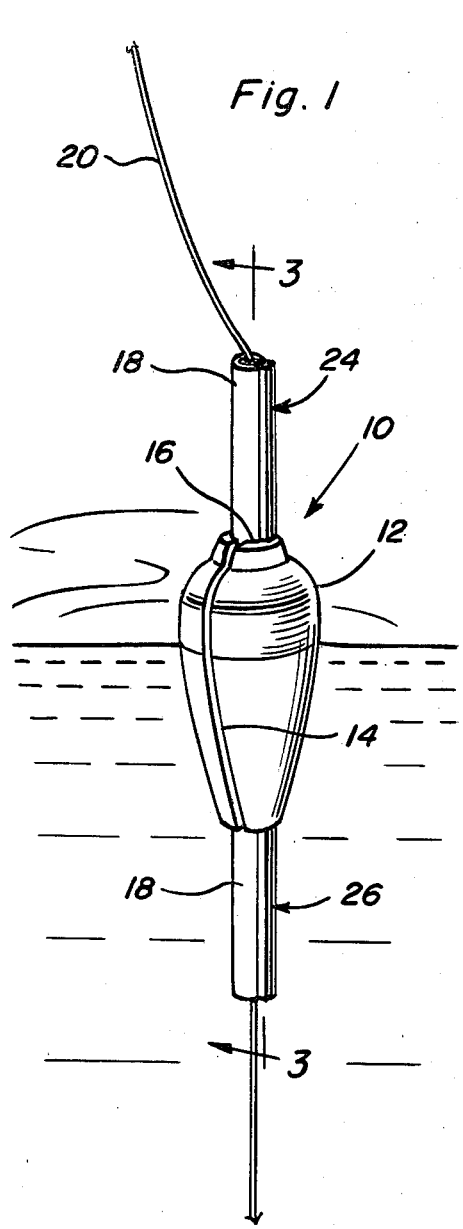
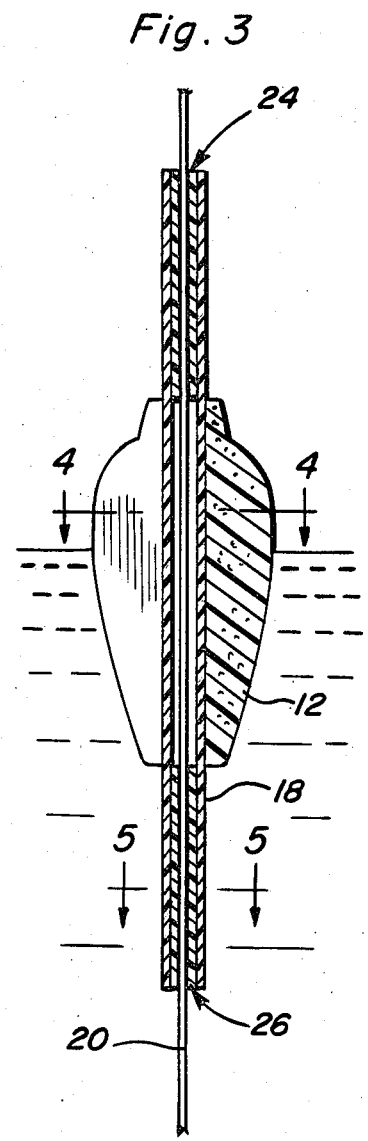
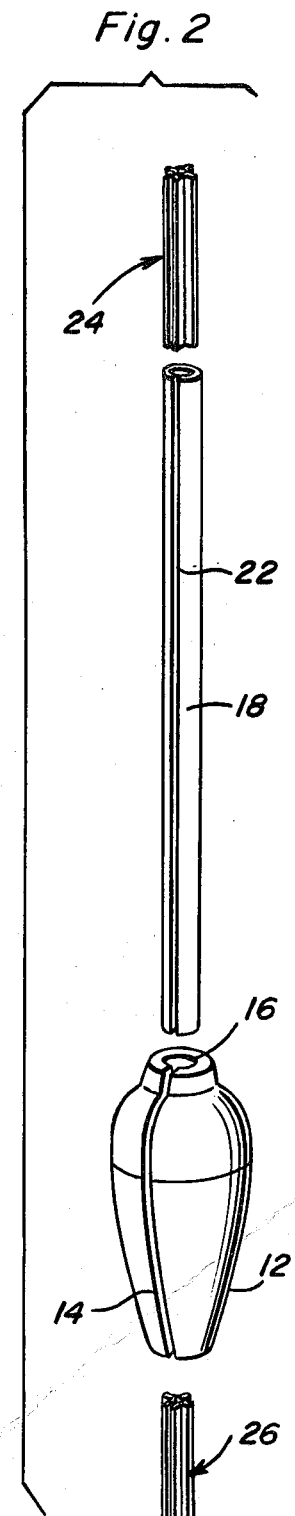
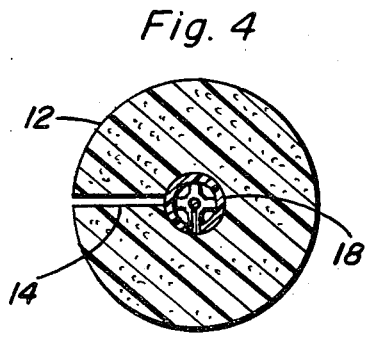
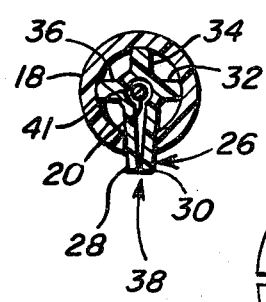
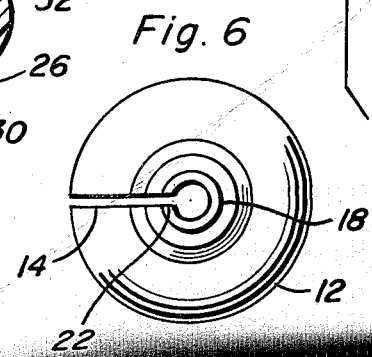

FISHING FLOAT

BACKGROUND OF THE INVENTION

1. Field of the Invention

The present invention relates generally to casting floats for fishing lines and more particularly pertains to slip-type floats.

2. Description of the Prior Art

There are currently two types of fishing floats on the market. One is a float which is attachable in a stationary position at a given place on a fishing line in relation to the associated hook or sinker weight. The other type of float is a slip-type float which allows a fishing line to pass freely through or around the float until a desired point has been reached. A typical slip float is constructed in such a manner that the float becomes a permanent part of the fishing line inasmuch as you must first feed the line through the float in order for it to be operational. Generally, the only way to remove such a slip float is to cut the line and remove it.

Additionally, many existing slip floats have the disadvantage of having tubes or sleeves in the float body which encumber the total effectiveness of the float by allowing the fishing line to become trapped or tangled in the slit tube or sleeves, thereby making it necessary to add additional parts, such as travel-limiting beads or plugs. This creates an additional problem when the float body is removed, as the additional parts remain on the fishing line which then further foul or encumber the line.

Accordingly, it can be appreciated that there exists a continuing need for improved slip floats which are entirely removable from a fishing line without the necessity of cutting the line and which do not tangle or get snagged on the line when in use. In this respect, the present invention substantially fulfills this need.

SUMMARY OF THE INVENTION

The general purpose of the present invention, which will be described subsequently in greater detail, is to provide a new and improved slip-type fishing float that has all the advantages of the prior art fishing floats and none of the disadvantages. To attain this, the present invention utilizes a float body having a radial slit in communication with an axially extending central bore. A slit tube is positionable through substantially the entire length of the float bore, such tube being rotatable within the bore so as to have its own slit selectively alignable with the slit positioned in the float. The fishing line is then positionable through the slits so as to be movable into the hollow center of the slit tube. The slit tube may then be rotated to effectively prevent the fishing line from slipping outwardly through the float slit, thus to become disengaged from the float. Additionally, a pair of star locks are provided, such locks each having five appendages with two of such appendages being paralleledly aligned and of a greater length than the remaining three appendages. The star locks are slidably positionable within the respective ends of the slit tube, with such positioning being accomplished by permitting the two longer appendages associated with each star lock to extend outwardly through the slit in the tube. At the same time, the fishing line is directed into the hollow bore of the star locks and due to the narrowness of the slit in the slit tube, the paralleledly aligned appendages on each star lock are pressed together so as to effectively prevent the fishing line from moving outwardly through the slit portion of the slit tube extending outwardly from the respective ends of the float.

It is therefore an object of the present invention to provide a new and improved slip-type fishing float that has all the advantages of the prior art slip-type fishing floats and none of the disadvantages.

It is another object of the present invention to provide a new and improved slip-type fishing float which may be easily and economically manufactured.

It is a further object of the present invention to provide a new and improved slip-type fishing float which is efficient and reliable in its operation and which is durable and rugged in its construction.

Yet another object of the present invention is to provide a new and improved slip-type fishing float which includes a quick change feature, thus to reduce the amount of time normally required to remove or attach a fishing float to a fishing line.

Even another object of the present invention is to provide a new and improved slip-type fishing float which includes the use of a locking means for efficiently retaining a fishing line within a slip float so as to prevent entanglements and snags therebetween.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the slip-type fishing float forming the present invention operably attached to a fishing line.

FIG. 2 is an exploded perspective view of the present invention illustrating the various parts forming the construction thereof.

FIG. 3 is a longitudinal sectional view of the present invention taken along the line 3—3 of FIG. 1.

FIG. 4 is a transverse sectional view of the present invention taken along the line 4—4 of FIG. 3.

FIG. 5 is a transverse sectional view of the present invention taken along the line 5—5 of FIG. 3.

FIG. 6 is a top plan view of the present invention illustrating the manner of operation thereof.

DESCRIPTION OF THE PREFERRED EMBODIMENT

With reference now to FIG. 1 of the drawings, a new and improved slip-type fishing float embodying the principles and concepts of the present invention and generally designated by the reference numeral 10 will be described. Specifically, it can be seen that the removable slip-type fishing float 10 includes a float body portion 12 having a radially extending slit 14 along an axial length thereof and being in communication with a central bore 16 also axially extending through the float body portion. Additionally illustrated is a slit tube 18 positioned within the bore 16 and extending outwardly from the respective ends of the float body portion 12. As shown, a length of fishing line 20 may be positioned through the slit tube 18, thereby to retain the fishing float 10 on the line.

To ascertain the more specific structural details of the slip float 10 forming the present invention, reference is next made to FIG. 2 of the drawings wherein the slit tube 18 is illustrated operably removed from the bore 16 of the float body portion 12. As clearly illustrated, the slit 14 associated with the float body portion 12 extends along the entire axial length of the float body portion and is in communication with the bore 16, thereby to provide a channel through which a length of fishing line 20 can be selectively directed. By the same token, it can be seen that the slit tube 18 is provided with an axially extending slit 22, such slit 22 being in communication with a hollow interior portion of the slit tube and being alignable with the slit 14 contained in the float body portion 12 once the slit tube per se is positioned within the bore 16 in the manner most clearly illustrated in FIG. 1. As can be appreciated, the slit tube 18 is slidingly positioned within the bore 16, thereby to permit a selective manual rotation of the tube within the bore 16 to effectively cause either an alignment or misalignment of the respective slits 14, 22 as desired. With a length of fishing line 20 in position within the central hollow portion of the slit tube 18, as effected by passing the line through the respective slits 14, 22 once the slit tube 18 is in position within the bore 16 and when the slits 14, 22 are aligned, a rotation of the slit tube 18 will effectively cause a misalignment of the slits 14, 22 so as to prevent the fishing line from passing back outwardly through the slit 14, thus to become disengaged from the float body portion 12.

Further illustrated in FIG. 2 is the use of a pair of star line locks generally designated by the reference numerals 24, 26. In this regard, it can be seen that the star locks 24, 26 are of identical construction and are respectively positionable in the respective ends of the slit tube 18 once the same is positioned within the bore 16 of the float portion 12.

As to the particular construction of the star locks 24, 26, reference is made to FIG. 5 in conjunction with FIG. 2, wherein the particular construction of star lock 26 will be described, such construction being identical to the construction of star lock 24 as aforementioned. In this respect, it can be seen that the star lock 26 includes five outwardly extending appendages 28, 30, 32, 34 and 36, with the appendages 28, 30 being substantially paralleledly aligned and of a somewhat greater length than the appendages 32, 34, 36. As such, a slit 38 is defined between the paralleledly aligned appendages 28, 30 with such slit being in communication with a central longitudinal bore portion 41 of the star lock 26 and serving as a receiving channel for a length of fishing line 20. As shown in FIGS. 1 and 3, the star locks 24, 26 are axially, slidably positionable within the respective ends of the slit tube 18 with substantially their entire lengths being normally contained within the slit tube with the appendages 28, 30 associated with each of the star locks extending outwardly through the slit 22 associated with the slit tube. By the same token, the remote ends of the appendages 32, 34, 36 are frictionally engageable with an interior wall portion of the slit tube 18, thereby to facilitate the retention of the respective star locks 24, 26 within the slit tube 18. Inasmuch as the width of the slit 22 associated with the slit tube 18 is of a minimal amount, a positioning of the respective star locks 24, 26 within the slit tube effectively results in the appendages 28, 30 being forced together so as to effectively retain fishing line 20 within the bore 41. As such, the star locks 24, 26 operate as locks to prevent the fishing line 20 from sliding into the slit 22 along those portions of the slit tube 18 extending outwardly from the float body 12, thus to prevent entanglements and the like between the fishing line and slit tube, while still permitting axial slidable movement of the slip float 10 along a length of the fishing line 20.

In use, it can be seen that a user of the slip float 10 will normally have the slit tube 18 already positioned within the bore 16 of the fishing float portion 12 and by manual rotation of the slit tube within the bore, the slits 14, 22, respectively associated with the float portion and the slit tube, may be aligned, so that a length of fishing line 20 may be conveniently laterally inserted or slid through the slits 14, 22, thereby to be brought into position within the interior hollow portion of the slit tube per se. A further manual rotation of the slit tube 22 may then be effected to cause a misalignment of the slits 14, 22, thereby to prevent the fishing line 20 from moving back outwardly through the slit 14 and thus out of engagement with the slip float 10.

Inasmuch as the slip float 10 is now positioned on a length of fishing line 20, the star locks 24, 26 may be positioned over the fishing line in the manner illustrated in FIG. 5, and with the appendages 28, 30 being aligned with the slit 22 of the slit tube 18, the individual star locks may be slid upwardly into the hollow interior of the slit tube at the respective ends thereof. This movement of the star locks 24, 26 into the interior of the slit tube 18 will result in a compressing together of the appendages 28, 30 respectively associated with each of the star locks, thus to effectively close off the slit 22 along a length thereof so as to slidably retain the fishing line 20 within the bore 41. Accordingly, the fishing line 20 is effectively prevented from becoming entangled with or encumbered by that portion of the slit 22 extending outwardly from the ends of the float body 12.

Of course, to disengage the fishing float 10 from the fishing line 20, when the same is slidably engaged therewith as illustrated in FIG. 4, a user need only to manually remove the star locks 24, 26 and then rotate the slit tube 18 so as to bring the slits 14, 22 into alignment, as illustrated in FIG. 6, thereby to permit the fishing line 20 to be moved freely away from the fishing float 10.

In summary, the star line locks 24, 26 retain the fishing line 20 in the sleeve or slit tube 18 in a manner which prevents the float 12 from tilting on the line as occurs when the line goes out the end of a larger diameter sleeve. Additionally, the smaller diameter effected by the insertion of a star lock into the slit tube enables a smaller travel-limiting bead to be used on the line as a stop, such bead only abutting against an end of the slit tube rather than partially entering the tube end as in the prior art.

With respect to the above description then, it should be realized that the optimum dimensional relationships for the parts of the invention are deemed readily apparent and obvious to one who is skilled in the art to which the invention pertains, and all equivalent relationships to those illustrated in the drawings and described in the specification, to include modification of form, size, arrangement of parts and details of operation are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A new and improved slip-type fishing float for use on a fishing line, said float comprising:
   float body means of a buoyant construction having a substantially centrally positioned, axially extending bore and further having a first slit extending radially outwardly from said bore and being in communication therewith; and
   slit tube means positionable within said bore and having a second slit associated therewith, said slit tube means being substantially frictionally retained within said bore and being selectively manually rotatable therein so as to selectively effect alignment and misalignment of said first and second slits as desired, said fishing line being directable through said first and second slits into said bore when said first and second slits are aligned and then being retained within said float body means by a manual rotation of said slit tube means so as to effect a misalignment of said first and second slits, at least one lock means for effecting a snag-free attachment of said slip-type fishing float to said fishing line, said lock means being operably attachable to said slit tube means so as to effect said snag-free attachment of said slip-type fishing float to said fishing line, said lock means including a central bore and outwardly extending appendages with said fishing line being positionable between said appendages into said central bore and being securely retained therein to effect a slidable securing of said fishing float to said fishing line, said appendages extending outwardly through said second slit contained in said slit tube means, said appendages being forced together when so positioned within said second slit, thereby to effectively prevent said fishing line from passing out of said central bore.

2. The slip-type fishing float as defined in claim 1, wherein said lock means includes further outwardly extending appendages, such further outwardly extending appendages having external edges thereof frictionally engageable with an interior wall portion of said slit tube means, thereby to effectively frictionally retain said lock means within said slit tube means.

3. A new and improved slip-type fishing float for use on a fishing line, said fishing float comprising:
   float body means of a buoyant construction having a substantially centrally positioned, axially extending bore and further having a first slit extending radially outwardly from said bore and being in communication therewith, said first slit being of a length substantially equal to a length of said bore;
   slit tube means slidably positioned within said bore and having a second slit associated therewith, said slit tube means being substantially frictionally retained within said bore and being selectively manually rotatable therein so as to selectively effect alignment and misalignment of said first and second slits as desired; and
   star lock means having five appendages with two of such appendages being paralleledly aligned with a space defined therebetween and being in communication with a central bore portion of said star lock means and three of such appendages being of a shorter length than said two paralleledly aligned appendages whereby said three shorter appendages have end portions engageable with an interior wall portion of said slit tube means and said two paralleledly aligned appendages are positionable within said second slit of said slit tube means, wherein said fishing line may be directed through said space between said two paralleledly aligned appendages into said central bore portion and may be slidably retained therein upon a positioning of said two paralleledly aligned appendages with said second slit due to a compression of said two paralleledly aligned appendages toward one another being effected by a narrowness in dimension of said second slit.

* * * * *